Aug. 14, 1945.  A. H. BAHNSON, JR  2,382,124
ATOMIZER
Filed June 10, 1942
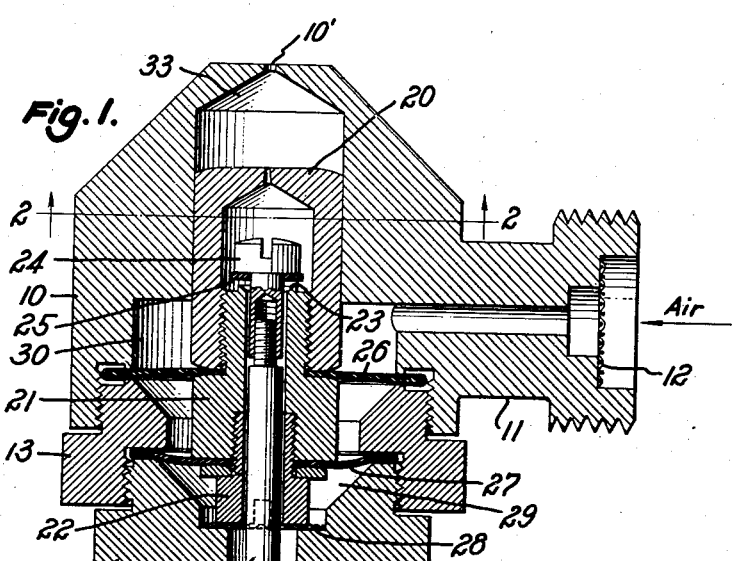
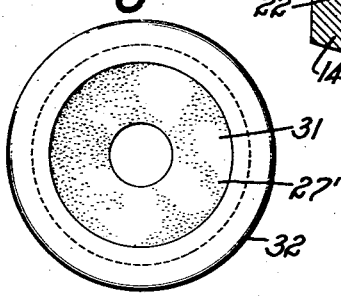
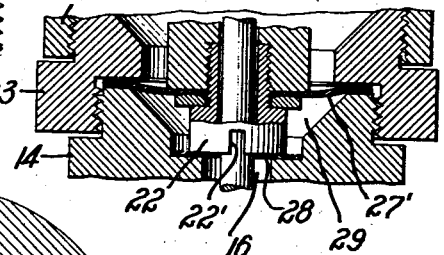
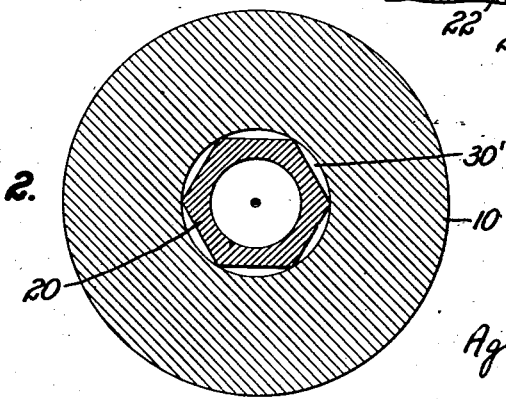

Patented Aug. 14, 1945

2,382,124

UNITED STATES PATENT OFFICE 2,382,124

ATOMIZER

Agnew H. Bahnson, Jr., Winston-Salem, N. C.

Application June 10, 1942, Serial No. 446,506

8 Claims. (Cl. 299—140)

This invention relates to atomizers and is particularly directed to atomizers of the type employed in humidifying systems.

A particular problem in the use of spray nozzles for the atomizing of liquids in a stream of gaseous fluid such as air is to insure that the flow of liquid is always stopped when the gas flow ceases or substantially decreases. If, for example, in an atomizer used in a humidifying system the water flow continues after the gas pressure has ceased or has fallen to a low value, or if the water flow can start in the absence of the full gas pressure, much damage may result from the discharge of ineffectively atomized water into the air ducts or into the conditioned spaces. Complicated mechanisms have been proposed for the purpose of preventing such occurrences, particularly for use when air, or other gaseous fluid, is available at a pressure higher than the pressure of the liquid.

A principal object of the present invention is the provision of a simple compact atomizer which positively shuts off the flow of liquid whenever the pressure of the gaseous fluid supplied to the atomizer falls below a predetermined level.

A further object of the invention is the provision of an atomizer in which the flow of liquid is positively controlled by the gaseous fluid pressure supplied to the atomizer.

Another object of the invention is the provision of an atomizer in which the liquid flow is controlled by gaseous fluid under a pressure lower than the liquid pressure.

A still further object of the invention is the provision of an atomizer in which the liquid flow is controlled by the pressure of the gaseous fluid supplied thereto without the use of springs or other resilient members.

The accomplishment of these and other objects and advantages will be apparent from the following description of an illustrative embodiment of the principles of the invention with particular reference to the accompanying drawing in which:

Fig. 1 is a central transverse section through an atomizer embodying the principles of the invention;

Fig. 2 is a sectional view on line 2—2 of Fig. 1;

Fig. 3 is a fragmentary central section showing a modified liquid pressure diaphragm in place in the atomizer, and Fig. 4 is a plan view of the liquid pressure diaphragm of Fig. 3.

The shell of the atomizer is provided by a body 10, having a lateral air or steam inlet 11, opening into air chamber 30 externally threaded to engage a suitable coupling member (not shown) for connecting the air or steam supply pipe to the atomizer. The forward portion of body 10 is bored to receive water nozzle cap 20, to be described later, and to provide a mixing chamber 33 adjacent the water nozzle, and terminates in a spray opening 10'. The inlet 11 is preferably provided with a filter screen 12.

The dependent skirt portion of body 10 is internally threaded to receive gland nut 13, the projecting portion of which is preferably hexagonal in external shape for convenience in assembly and disassembly. Internally the projecting portion of gland nut 13 is threaded to receive the threaded portion of back cap 14, which has a dependent projection externally threaded to engage a suitable coupling member (not shown) for connecting a water pipe to the atomizer. The intermediate portion of cap 14 is preferably hexagonal in external shape.

The internally projecting portion of back cap 14 is threaded to receive the fixed valve stem 15 and inwardly of the threaded portion is bored to provide a water passage 16. The lower end of valve stem 15 is bored to provide a passage 15' from the end thereof into water passage 16.

Concentrically positioned about valve stem 15 is a movable valve assembly comprising water nozzle cap 20, preferably of hexagonal external shape, slidably mounted in the bore of body 10 to provide an air channel 30' between the nozzle cap 20 and body 10 and bored to receive the upper end of the valve stem, a gland nut 21 threaded into the skirt of cap 20 and a gland nut 22 threaded into the skirt of gland nut 21. The internal bores of gland nuts 21 and 22 are larger than the external diameter of valve stem 15 to provide a water passage from passage 16 to the annular valve seat 23 formed at the inner end of gland nut 21.

The valve stem 15 is provided with an adjustable cap member 24 threaded thereon and carrying a sealing disc 25, adapted to engage the valve seat to close the water passage. An annular flexible diaphragm 26, advantageously made of neoprene, is engaged adjacent its outer edge between opposed shoulders on body 10 and gland nut 13 and adjacent its inner edge between the end of the skirt of water nozzle cap 20 and gland nut 21.

A similar annular diaphragm 27, typically of smaller effective surface area than diaphragm 26, is engaged adjacent its outer edge between gland nut 13 and back cap 14, and adjacent its inner edge between gland nuts 21 and 22. The movable valve assembly is hollow and constitutes a part of the liquid passage that is supported by the diaphragms 26, 27 for displacement in accordance with the forces developed by the pressures of the liquid and the gaseous medium within their respective passages.

A filter screen 28 is preferably positioned in the water passage around the stem 15. A slot 22' is provided in the skirt portion of gland nut 22 to provide communication between water passage 16 and chamber 29 adjacent diaphragm 27.

It will be seen that the pressure of water or other liquid in chamber 29 on diaphragm 27 will urge the valve assembly upward along valve stem 15 to close the valve while the pressure of air or other gaseous fluid in chamber 30 on diaphragm 26 will urge the valve assembly downward along valve stem 15 to open the valve. By suitably selecting the relative effective surface areas of the diaphragms 26, 27, the valve may be caused to open upon the supply to the atomizer of any predetermined gaseous pressure and to close whenever the gaseous pressure falls below a predetermined point. By providing a diaphragm 26 of greater effective area than the diaphragm 27, the valve can be caused to open and the atomizer to operate at gaseous pressures substantially lower than the pressure of the liquid supplied to the atomizer. For example, an atomizer constructed as shown in Fig. 1 of the drawing has operated very effectively with a water pressure of 25 pounds and an air pressure of 20 pounds. To provide for easy adjustment of the atomizer for satisfactory operation at other air and water pressures, the effective area of diaphragm 27 may be readily altered by substituting diaphragm assemblies having smaller or larger effective areas.

As shown in Figs. 3 and 4, the diaphragm assembly 27' comprises a flexible annular disc 31 preferably of neoprene and a metal rim 32. In the form shown by way of illustration, the rim 32 extends farther inward on the lower pressure side of the diaphragm than in the diaphragm 27 shown in Fig. 1, thereby reducing the effective area of the diaphragm.

In operation, the liquid entering the atomizer through passage 15' passes through passage 16, valve 23 and nozzle 20 whereby it is sprayed into the stream of gaseous fluid, such as air or steam entering the atomizer through inlet 11 and passing through chamber 30 and passage 30', and the resultant atomized liquid is emitted at opening 10'. Upon reduction of the gas pressure, either intentionally or accidentally below a predetermined amount, the effective differential force acting on diaphragm 27 will close valve 23 and shut off the supply of liquid.

It will be seen that the invention comprises not only the specific elements and embodiments illustrated herein, but broadly embraces an atomizer for liquids comprising a liquid nozzle, means providing a passage for liquid from an inlet to the nozzle, a mixing chamber adjacent the nozzle, means providing a passage for gaseous fluid from an inlet to the mixing chamber, a valve in the liquid passage, a member responsive to pressure in the liquid passage between the inlet and the valve to urge the valve into closed position, and a further member responsive to pressure in the gaseous fluid passage to urge the valve into open position.

I claim:

1. In an atomizer for liquids comprising body means providing a chamber having an inlet for gaseous fluid, an inlet for liquid, and a common outlet for gaseous fluid and liquid, a fixed member mounted in said chamber, a relatively stationary valve element adjustable with respect to said fixed member, a hollow movable member telescoped over said fixed member and carrying a complementary valve element, a flexible member connecting said movable member and said body means to define a passage from said liquid inlet to said complementary valve elements, and a further flexible member connecting said movable member and said body means to define a passage from said gaseous fluid inlet to said common outlet, whereby the relative position of said complementary valve elements depends upon the pressures exerted upon said flexible diaphragms by the fluids within the respective passages.

2. An atomizer of the type including a shell having outlet means and separate inlets for liquid and a gaseous medium, means within the shell providing liquid and gaseous medium passages from the respective inlets to said outlet means, and a valve for the liquid passage including a valve member and a cooperating movable valve member urged towards valve-open position by pressure in said gaseous medium passage, characterized by the fact that said movable valve member is hollow and constitutes a part of said liquid passage, and said passage-providing means includes a pair of flexible members forming wall portions of the respective passages and supporting said movable valve member for axial movement.

3. An atomizer as recited in claim 2, wherein said liquid passage includes a nozzle cap carried by said movable valve member and enclosing said first valve member.

4. An atomizer as recited in claim 2, wherein said atomizer shell comprises a plurality of sections, the liquid and the gaseous medium inlets being in different shell sections, and the outer edges of said flexible members are clamped between different pairs of sections of said shell.

5. In an atomizer, a shell having a liquid inlet and a gaseous medium inlet, a mixing chamber within said shell having an outlet for the discharge of the atomized liquid, a liquid nozzle slidable in said shell and having an orifice opening into said mixing chamber, means including relatively movable valve members providing a liquid passage from said liquid inlet to said nozzle, at least one of said valve members being movable with said liquid nozzle, means including a flexible diaphragm forming a gaseous medium chamber open to said gaseous medium inlet and to said mixing chamber, and means including a flexible diaphragm forming a liquid chamber between said liquid inlet and said liquid passage; said diaphragms being connected to said slidable liquid nozzle and the valve member movable therewith, and the pressures in said gaseous medium and liquid chambers tending to displace said liquid nozzle and associated valve member in opposite directions.

6. In an atomizer, the invention as recited in claim 5, wherein the diaphragm of said gaseous medium chamber is of larger effective area than the dipahragm of said liquid chamber, whereby said liquid valve may be opened by a gaseous medium of lower pressure than that of the liquid.

7. In an atomizer, a shell including an intermediate section between and secured to a rear cap and a main body, said main body having an axial bore therethrough, said shell having a spray outlet at its forward end and an interior mixing space at the forward end of the bore from which spray is discharged through said outlet, a liquid inlet through the rear cap, a gaseous medium inlet through the wall of the main body and opening into the bore thereof, flexible diaphragms extending across said shell at opposite ends of said intermediate shell section, a hollow valve and liquid passage assembly extending through said intermediate shell section and supported for axial movement by said diaphragms, liquid nozzle means carried by said movable assembly and opening into said mixing space, said movable assembly carrying a valve element, and a cooperating relatively stationary valve element supported within said shell for engagement by the valve element of the movable assembly upon axial displacement of the same towards the forward end of said shell, whereby liquid pressure on the rear face of the rear flexible diaphragm tends to close the valve and pressure on the forward face of the forward diaphragm tends to open the valve.

8. In an atomizer, the invention as recited in claim 7, wherein the effective area of the forward flexible diaphragm is greater than that of the rear diaphragm, whereby said assembly may be moved rearwardly to open the valve by a gaseous medium pressure less than that of the liquid.

AGNEW H. BAHNSON, JR.